United States Patent Office 3,418,359
Patented Dec. 24, 1968

3,418,359
ORGANO-TITANIUM COMPOUNDS AND ZINC DICARBOXYLATES AS SYNERGISTIC ESTERIFICATION CATALYST
Walter P. Barie, Jr., Pittsburgh, Norman W. Franke, Penn Hills Township, Allegheny County, and Arthur C. Whitaker, Pittsburgh, Pa., assignors to Gulf Research & Development Company, Pittsburgh, Pa., a corporation of Delaware
No Drawing. Filed Apr. 18, 1963, Ser. No. 273,846
12 Claims. (Cl. 260—475)

This invention relates to an improved catalyst for use in esterification processes.

A large number of organo-metallic and metallo-organo compounds are known in the art as catalysts for the direct esterification of alcohols with organic acids. These catalysts have certain advantages, especially for the reaction of higher molecular weight alcohols ($C_4$ plus) and organic acids in producing light-colored esters which are particularly valuable as plasticizers in the production of light-colored plastics. These organo-metallic and metallo-organic compounds suffer, however, from the disadvantage of a slow reaction rate. It has now been found that the advantages of the use of these catalysts can be retained and an unexpected increase in reaction rate achieved by employing selected mixtures of these compounds.

In accordance with the invention, an improved esterification process is achieved by contacting an alcohol with an organic acid in the presence of a catalyst comprising at least one quadrivalent titanium-organic compound wherein the titanium is directly connected to four oxygen atoms and at least one zinc dicarboxylate.

The preferred quadrivalent titanium-organic compounds, wherein the titanium is directly connected to four oxygen atoms, can be represented by the general formula:

$$Z\left(\begin{array}{c} X \\ | \\ O-Ti \\ | \\ X' \end{array}\right)_n Y$$

where $n$ is an integer between 1 and 60;

X is a radical selected from the group consisting of —OR and

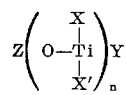

where R is as defined below;

X' is a radical selected from the group consisting of —OR and

where R is as defined below;

Z is a radical selected from the group consisting of —R; —Ti(OR)$_3$; and

when Y is

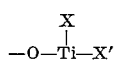

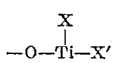

where X and X' are as defined above and R is as defined below;

Y is a radical selected from the group consisting of —OR;

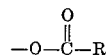

and

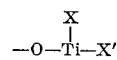

when Z is

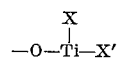

where X and X' are as defined above and R is as defined below; and where R is a radical selected from the group consisting of an aliphatic radical having from 2 to 18 carbon atoms; an alicyclic radical having between 1 and 3 rings, between 5 and 6 carbon atoms per ring, and between 5 and 18 carbon atoms per molecule; and an aromatic radical having between 1 and 3 rings and between 6 and 18 carbon atoms per molecule.

Where $n$ in the general formula above is one, the titanium compounds are monomers. Examples of suitable monomeric titanium compounds include:

(1) the tetrahydrocarbyl titanates represented by the general formula:

$$Ti(OR)_4$$

where R is as defined above. By hydrocarbyl is meant a monovalent radical derived from a compound consisting of carbon and hydrogen. Examples of suitable tetrahydrocarbyl titanates include tetraethyl titanate; tetrapropyl titanate; tetraisopropyl titanate; tetrabutyl titanate; tetraisooctyl titanate; tetrastearyl titanate; tetrabenzyl titanate; tetracyclohexyl titanate; tetraphenyl titanate; tetradodecyl titanate and tetraallyl titanate, and (2) the dititanates represented by the general formula:

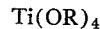

where R is as defined above. Suitable specific examples of these compounds include hexaethyl dititanate; hexapropyl dititanate; hexaisopropyl dititanate; hexaisooctyl dititanate; hexastearyl dititanate; hexabenzyl dititanate; hexaphenyl dititanate; hexacyclohexyl dititanate; triethyltripropyl dititanate; trioctyltriphenyl dititanate and hexadodecyl dititanate.

Where $n$ in the general formula above is more than one, a polymer results. The polymer can be cyclic, in which case both Z and Y are

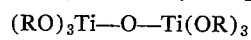

where X and X' are as defined above. The polymer can be a straight chain polymer with terminating groups Y and Z selected from the class as defined above.

The zinc dicarboxylates which are useful as co-catalysts in the process of this invention may be represented by the general formula:

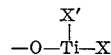

where R''' can be an aliphatic radical having from 1 to 18 carbon atoms; an alicyclic radical having between 1 and 3 rings, between 5 and 6 carbon atoms per ring, and between 5 and 18 carbon atoms per molecule; and an aromatic radical having between 1 and 3 rings and between 6 and 18 carbon atoms per molecule. Suitable specific examples of zinc compounds which can be employed include zinc acetate; zinc propionate; zinc butyrate; zinc octanoate; zinc laurate; zinc stearate; zinc cyclohexane carboxylate; zinc cyclopentane carboxylate; zinc benzoate; zinc maleate; zinc salicylate; zinc caproate; zinc naphthenate; zinc phenanthroate and zinc oleate.

The subject process is applicable to the reaction of an organic acid with an alcohol to form a product comprising an ester group. By an organic acid is meant any compound containing between 1 and 8 carboxyl groups, —COOH, or the inner anhydride derivatives thereof. The preferred organic acids are those wherein the only functional groups are between 1 and 8 carboxyl groups or the inner anhydride derivatives thereof. The preferred organic acids have between 1 and 4 carboxyl groups per molecule. The organic acid can have between 2 and 30 carbon atoms per molecule with preferred organic acids having between 2 and 20 per molecule.

Suitable organic acids include any aliphatic, alicyclic or aromatic mono- or polycarboxylic acids or inner anhydride derivatives thereof. By an inner anhydride derivative thereof is meant a cyclic anhydride formed by the elimination of water and cyclization of two carboxyl groups on the same molecule. The alicyclic acids can have between 5 and 6 ring carbon atoms and between 1 and 3 rings. The aromatic acids can have between 1 and 3 rings. The monohydroxy, monohalo, monoamino and monoketo organic acids can also be employed. The most preferred organic acids are the aromatic carboxylic acids or the inner anhydride derivatives thereof having between 1 and 2 rings, between 2 and 4 carboxyl groups, and wherein the only functional groups are the carboxyl groups. Examples of suitable organic acids include acetic; propionic; butyric; isobutyric; valeric; hexaonic; heptanoic; octanoic; pelargonic; lauric; myristic; palmitic; stearic; decanoic; tridecanoic; acrylic; methacrylic; crotonic; maleic; fumaric; vinylacetic; undecylenic; linolenic; cyclopropanecarboxylic; cyclobutanecarboxylic; cyclopentanecarboxylic; cyclohexylcarboxylic; cycloheptanecarboxylic; benzoic; phenylacetic; phenylpropionic; triphenylacetic; o-, m- and p-phthalic; para-nitrobenzoic; para-chlorobenzoic; para-dodecylbenzoic; alpha - naphthoic; beta - naphthoic; pyruvic; levulinic; benzoylacetic; alpha-benzoylbutyric; alpha-aminoisobutyric; beta-aminopropionic; o-, m- or p-hydroxybenzoic; ethoxyacetic; alpha-ethoxyisobutyric; furfuroic; alpha-fluoropropionic; beta-bromopropionic; alpha-chloroacetic; trifluoroacetic; malonic; succinic; glutaric; adipic; pimelic; azelaic; sebacic; pentadecane-1,15-dicarboxylic; pentacosane-1,25-dicarboxylic; cyclohexane-1,2-dicarboxylic; benzophenonedicarboxylic; 1,2,3-propanetricarboxylic acid; trimellitic; 1,3,5-cyclohexanetricarboxylic; pyromellitic; 3,4,3',4'-benzophenonetetracarboxylic; 2,3,5,6,2',3',5',6' - benzophenoneoctacarboxylic; lactic; beta-hydroxypropionic; alpha-hydroxybutyric; beta-hydroxybutyric; succinic anhydride; glutaric anhydride; maleic anhydride; citraconic anhydride; itaconic anhydride; phthalic anhydride; pyromellitic dianhydride; 3,4,3',4'-benzophenonetetracarboxylic dianhydride; and 2,3,5,6,2',3',5',6'-benzophenoneoctacarboxylic tetraanhydride.

By an "alcohol" is meant any organic compound containing between 1 and 4 alcoholic hydroxyl groups, wherein at least one of said alcoholic hydroxyl groups is attached to a carbon atom having at least one substituent hydrogen atom. The alcohol can have between 1 and 37 carbon atoms per molecule, preferably between 4 and 20 and most preferably between 8 and 13 carbon atoms per molecule. The monohydric alcohols can be represented by the general formula:

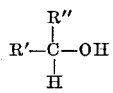

where R' and R" can be the same or different and are selected from the group consisting of hydrogen and R''' as defined for the zinc compounds above. Specific examples of suitable monohydric alcohols include n-butyl; iso- butyl; sec-butyl; n-amyl; isoamyl; 2-methylpentanol-3; n-octyl; 7-methylheptanol-1; capryl; 8-methylnonanol-1; lauryl; 11 - methyldodecanol - 1; tetradecyl; hexadecyl; stearyl; benzyl; phenylethyl; o-, m- and p-methylbenzyl; hexanol-3; decanol-4; dodecanol-5; allyl; 2-octenol-1; 3-nonenol-1; 4-decenol-1; 5-dodecenol-1; 6-dodecenol-2; 5-octacosenol-16; 4-tricontenol-12; heptacontanol-14; and cyclohexanol.

Mixtures of these alcohols can also be employed. Particularly suitable mixtures are the reaction products obtained by the hydroformylation and subsequent hydrogenation of at least one olefin having between 3 and 19 carbon atoms per molecule, and more particularly those mixtures of alcohols obtained as the reaction product of the hydroformylation and subsequent hydrogenation of at least one olefin having between 7 and 12 carbon atoms per molecule. For example, hexyl, isooctyl, decyl and tridecyl oxo alcohols are available commercially.

Polyhydric alcohols containing between 2 and 4 alcoholic hydroxyl groups (e.g., glycols) can also be employed. In general, the polyhydric alcohols which are used as reactants in the process of this invention have between 4 and 30 carbon atoms per molecule and preferably have between 7 and 15 carbon atoms per molecule. Suitable examples of polyhydric alcohols include butylene glycol; pentadecane-1,15-diol; pentamethylene glycol; neopentyl glycol; 1,2,3-trihydroxybutane; trimethylolheptane; and pentaerythritol.

From the definition of the organic acid and alcohol above, it can be seen that the subject process relates to the reaction of an organic compound having at least one carboxyl group with an organic compound having at least one alcoholic hydroxyl group to form a product comprising an ester group. If at least one of the two reactants is monofunctional then a monomeric ester will be obtained as the product. By a monomeric ester is meant an organic compound containing at least one ester group per molecule but no more ester groups per molecule than the corresponding number of carboxyl groups in the organic acid reactant or the number of alcoholic hydroxyl groups in the alcoholic reactant from which the monomeric ester is prepared. For example, the reaction of normal octyl alcohol and butanoic acid produces the monomeric ester octyl butanoate, while the reaction of normal octyl alcohol with phthalic anhydride produces the monomeric diester dioctyl phthalate.

By a polyester is meant the reaction product of an organic acid having 2 or more carboxyl groups per molecule with an alcohol having 2 or more alcoholic hydroxyl groups per molecule. The polyester usually has a molecular weight between about 500 and 10,000, or more. The improved catalysts of this invention are suited to the preparation of either monomeric esters or polyesters.

Theoretically, to produce an ester, one mol of a monohydric alcohol is needed for each mol of a monocarboxylic acid. When a polyfunctional reactant is employed, a molar increase in the monofunctional reactant corresponding to the number of functional groups in the polyfunctional reactant must be employed to obtain a theoretically complete reaction. The degree of completion and completion rate are improved, however, by the presence of a molar excess of one or the other of the reactants over the theoretical amount needed for complete conversion. It is preferred for ease of recovery to have an excess within the reaction zone of that reactant which distills at the lower temperature. Since at least one of the reactants may be polyfunctional, it is preferred to discuss the molar ratio of reactants in terms of the molar ratio of alcoholic hydroxyl groups in the alcohol reactant to carboxyl groups in the organic acid reactant. As noted above, the term "organic acid" is meant to include the inner anhydride derivatives thereof. The number of carboxyl groups per molecule of inner anhydride is taken to mean the number of carboxyl groups which would be present in the hydrated form of the anhydride. Thus, phthalic and maleic anhydrides would be considered to have two carboxyl groups per molecule. Thus, the molar ratio of alcoholic hydroxyl groups in the alcohol reactant to carboxyl groups in the organic acid reactant can be between 1:30 and 30:1 with preferred molar ratios between 1:5 and 5:1.

To illustrate the above, if one mol of octyl alcohol is employed as the alcohol reactant and a 1:1 molar ratio of hydroxyl groups in the alcohol reactant to carboxyl groups in the organic acid reactant is desired, then the molar amounts of acetic acid (a monocarboxylic acid); adipic acid (a dicarboxylic acid); phthalic anhydride and pyromellitic dianhydride as the organic acid reactants should be 1; 0.5; 0.5; and 0.25 respectively.

The amount of titanium catalyst calculated as titanium to be employed can vary between 0.001 and 5 weight percent titanium based on the weight of the expected ester with preferred amounts of the titanium catalyst being 0.01 and 1 percent by weight titanium of the expected ester.

The weight ratio of the zinc catalyst to the titanium catalyst, based on the weight of the metals alone, can be between 1:5 and 5:1 and preferably the weight ratio of the zinc to the titanium catalyst, based on the weight of the metals alone, can be between 1:2 and 2:1.

The function of reaction temperature is to increase the rate of reaction. In general, the temperature of reaction can be between 70° C. and 300° C. depending upon the boiling point of the chosen reactants. The best temperature to be employed for any particular acid or alcohol may readily be determined by one skilled in the art. In general, the higher molecular weight alcohols and acids react more slowly and the higher reaction temperatures are desired to increase the reaction rate. The temperature of the reaction must be high enough to remove the water of the esterification, but not so high that the acid or alcohol charge stock is removed. It is sometimes preferable to employ an azeotroping agent, such as benzene, to remove the water and thus allow for the use of lower reaction temperatures. Preferred reaction temperatures are between 100° C. and 250° C. with the most preferred reaction temperatures being between 135° C. and 200° C.

Any reaction pressure can be employed. Atmospheric pressure is preferred. The use of lower reaction pressures allows the use of lower reaction temperatures since the water of esterification will be removed more easily. The use of pressures in excess of atmospheric allows the use of higher temperatures. Thus, pressures between 5 and 250 p.s.i.a., or higher can be employed with the preferred pressure being atmospheric pressure. Reaction conditions that are best suited for the type and concentration of alcohol, organic acid and catalyst and for the particular apparatus may readily be determined by one skilled in the art familiar with such processes, in accordance with the teachings above.

It is usually desirable to maintain in inert atmosphere, such as nitrogen, carbon dioxide or helium gas, over the reaction mixture to reduce oxidation of the charge stock and products.

The reaction time is usually between 0.5 and 30 hours or more depending on the particular reactants and the degree of completion desired. In general, the lower molecular weight and monofunctional reactants react more quickly. Reaction times less than 30 minutes usually result in conversions which are too low while the reaction times above about 30 hours are usually impractical.

It is preferred that the reactants be liquid under reaction conditions and, in addition, it is preferred that the reactants be miscible. In many instances, however, the acid reactant is a solid polycarboxylic acid, for example citric acid, whose solubility in organic alcohols, particularly the higher alcohols, may be limited. In certain instances, therefore, it may be desirable to employ a common inert solvent or diluent to dissolve those reactants before entering the reaction zone. These solvents sometimes serve a dual function of an azeotroping agent to remove the water of the esterification. Any diluents which would react with the charge components should, of course, be avoided. Suitable diluents include saturated aliphatic and alicyclic hydrocarbons having between 5 and 30 carbon atoms per molecule and preferably between 5 and 16 carbon atoms per molecule, and aromatic hydrocarbons having between 1 and 3 rings and between 6 and 18 carbon atoms per molecule. Suitable specific examples of inert diluents include pentane; hexane; heptane; decane; cetane; cyclohexane; cyclopentane; benzene; toluene; o-xylene; m-xylene and p-xylene.

The invention will be further described with relation to the following specific examples.

In all of the examples the following procedure was employed except where otherwise indicated. The organic acid reactant for all of the examples was phthalic anhydride. The alcohol reactant was either a mixture of isooctyl or tridecyl oxo alcohols obtained by the hydroformylation and subsequent hydrogenation of a mixture of branched-chain heptenes and branched-chain $C_{12}$ olefins, respectively. The mixture of branched-chain heptenes was the 87° F. to 94° F. fraction of the product from the alkylation of propylene and butene. The $C_{12}$ olefins are the 186° F. to 195° F. fraction of the product from the sulfuric acid polymerization of propylene.

In each run, one mol (148 grams) of phthalic anhydride was reacted with approximately 2.1 mols of the oxo alcohol (5% excess) at a temperature of 180° C. using a nitrogen purge gas (0.13 liter per minute). Fifty milliliters of heptane were added, along with the desired catalyst or catalyst mixture. The heptane was added as an azeotroping agent as an aid in removing the water overhead. The rate of esterification was followed by measuring the water of the esterification at various time intervals.

In each example the product was treated with a 1 percent sodium hydroxide solution until basic to pH paper. The aqueous alkaline layer was removed and the organic layer was washed with hot water (70° to 80° C.) until the washing was neutral to pH paper. The product was distilled at reduced pressure (100 to less than one mm. of Hg) to remove the water and the heptane. Any unreacted alcohol was also removed at reduced pressure (less than 1 mm. of Hg). The distillation temperature was then taken to 150° C. for isooctyl alcohol and 200° C. for tridecyl alcohol at the reduced pressure. The product was then treated with 2 grams of activated carbon (about 0.5 percent by weight) at 90° C. for one-half hour and filtered using Celite and a fritted glass filter.

Example 1

In the run for this example, 2.1 mols (273 grams) of oxo isooctyl alcohol, whose properties are given in Table I below, was reacted with phthalic anhydride as described above using 4.58 grams (0.1 percent by weight of titanium based on the weight of the expected ester diisooctylphthalate) of tetra(2-ethylhexyl) titanate as the catalyst. The weight percent conversion of phthalic anhydride after a six hour reaction period was 95.0 and the APHA color (by ASTM test method D–1209–54) of the ester product was 15.0. The weight percent conversion was calculated by dividing the weight of water produced in the reaction by the theoretical weight of water which should have been produced.

TABLE I.—TYPICAL INSPECTIONS OF ALCOHOLS

| | Isooctyl alcohol | Tridecyl alcohol |
|---|---|---|
| Specific gravity, 20°/20° C. (68°/68° F.) | 0.833 | 0.845 |
| Color, APHA (by ASTM D-1209-54) | 3 | 3 |
| Refractive Index, $n_D^{20}$ | 1.4312 | 1.4473 |
| Sulfur, p.p.m. | 3 | 1 |
| Water, percent by weight | 0.020 | 0.008 |
| Acidity as acetic acid, percent by weight | 0.001 | 0.003 |
| $C_8$ carbonyl content, percent by weight | 0.01 | |
| $C_{13}$ carbonyl content, percent by weight | | 0.04 |
| Distillation: ASTM D1078: | | |
| Initial boiling point,° C | 185 | 254.9 |
| Dry Point,° C | 188.5 | 262.9 |

Example 2

Example 1 was repeated except the tetra(2-ethylhexyl) titanate catalyst was replaced by 1.31 grams (0.1 percent by weight of zinc based on the weight of the expected ester) of zinc acetate. The weight percent conversion of phthalic anhydride after a six hour reaction period was 87.3 and the APHA color of the ester product was 10.0.

Example 3

Example 1 was repeated except the catalyst consisted of 2.29 grams (0.05 percent by weight of titanium based on the weight of the expected ester) of tetra(2-ethylhexyl) titanate and 0.66 gram (0.05 percent by weight of zinc based on the weight of the expected ester) of zinc acetate. The weight percent conversion of phthalic anhydride after a five hour reaction period was 99.5 percent and the APHA color of the ester product was 10.0.

A comparison of Examples 1, 2 and 3 shows that the use of a mixture of tetra(2-ethylhexyl) titanate and zinc acetate gives more than the additive and expected results over the use of either catalyst alone in the same total catalyst concentration in the reaction mixture. That is, a greater weight percent conversion (99.5) was achieved using the mixture of titanium and zinc than with either the titanium (95.0) or the zinc (87.3) catalyst alone in a shorter reaction time, i.e. five hours for the catalyst mixture compared to six hours for the individual catalyst components. In addition, the color of the ester was as good as when using the zinc acetate alone and better than when using the titanium catalyst alone.

Example 4

Example 3 was repeated except the alcohol reactant was 420 grams (2.1 mols) of oxo tridecyl alcohol, whose properties are given in Table I above. The weight precent cnversion of phthalic anhydride after a six hour reaction period was 98.5 and the APHA color of the ester product was 15.0.

A comparison of Example 4 with Examples 1 and 2 shows again the unexpected additive effect of employing a mixture of the titanium and zinc compounds of this invention. The weight percent conversion of phthalic anhydride was higher (98.5 weight percent) than when either the titanium (95 weight percent) or zinc (87.3 weight percent) compounds were used alone, despite the fact that a higher molecular weight alcohol was used as a reactant.

Resort may be had to such variations and modifications as fall within the spirit of the invention and the scope of the appended claims.

We claim:

1. A process for the production of a light colored monomeric ester which comprises contacting an aromatic organic acid reactant having between 1 and 4 carboxyl groups per molecule with a saturated unsubstituted aliphatic alcohol reactant having between 4 and 37 carbon atoms per molecule, and wherein at least one of the two reactants is monofunctional under esterification conditions in the presence of a catalyst comprising at least one quadrivalent titanium-organic compound having the formula:

where R is selected from the group consisting of an acyclic saturated or olefinically unsaturated hydrocarbon radical having between 1 and 18 carbon atoms; cyclohexyl and phenyl; and at least one zinc dicarboxylate represented by the general formula:

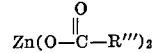

where R''' is selected from the group consisting of an acyclic saturated or olefinically unsaturated hydrocarbon radical having between 1 and 18 carbon atoms; a single ring alicyclic hydrocarbon radical having between 5 and 6 carbon atoms per ring and between 5 and 18 carbon atoms per molecule; and a single ring aromatic hydrocarbon or hydroxy substituted aromatic hydrocarbon radical having between 6 and 18 carbon atoms per molecule.

2. A process according to claim 1 wherein the aromatic organic acid is phthalic anhydride.

3. A process according to claim 1 wherein the zinc dicarboxylate is zinc acetate.

4. A process according to claim 1 wherein the titanium organic compound is tetra(2-ethylhexyl)titanate.

5. A process according to claim 1 wherein the alcohol reactant comprises the reaction product obtained by the hydroformylation of at least one olefin having between 3 and 19 carbon atoms per molecule.

6. A process according to claim 5 wherein said alcohol reactant comprises the reaction product obtained by the hydroformylation of at least one olefin having between 7 and 12 carbon atoms per molecule.

7. A process according to claim 6 wherein said aromatic carboxylic acid is phthalic anhydride.

8. A process according to claim 7 wherein said quadrivalent titanium compound is tetra(2-ethylhexyl) titanate.

9. A process according to claim 7 wherein said zinc dicarboxylate is zinc acetate.

10. A process according to claim 7 wherein said quadrivalent titanium compound is tetra(2-ethylhexyl) titanate and said zinc dicarboxylate is zinc acetate.

11. A process for the production of diisooctyl phthalate which comprises contacting isooctyl alcohol with phthalic anhydride under esterification conditions in the presence of a catalyst comprising a mixture of tetra(2-ethylhexyl) titanate and zinc acetate.

12. A process for the production of di-tridecyl phthalate which comprises contacting tridecyl alcohol with phthalic anhydride under esterification conditions in the presence of a catalyst comprising a mixture of tetra(2-ethylhexyl) titanate and zinc acetate.

References Cited

UNITED STATES PATENTS

| 2,727,881 | 12/1955 | Caldwell et al. | 260—475 |
| 3,022,333 | 2/1962 | Kalfadelis et al. | 260—475 |
| 3,067,178 | 12/1962 | Greenberg et al. | 260—475 |
| 3,056,818 | 10/1962 | Werber | 260—475 |

LORRAINE A. WEINBERGER, *Primary Examiner.*

T. L. GALLOWAY, *Assistant Examiner.*

U.S. Cl. X.R.

260—476, 474, 471, 468, 488, 485, 486, 469, 482, 487, 410.6, 410.9, 347.4, 484